United States Patent
Li et al.

(10) Patent No.: US 10,473,889 B2
(45) Date of Patent: Nov. 12, 2019

(54) EXPERIMENTAL SYSTEM FOR LASER BEAM MEASUREMENT AND STEERING CONTROL

(71) Applicant: National University of Defense Technology, Changsha (CN)

(72) Inventors: Dongxu Li, Changsha (CN); Shipeng Feng, Changsha (CN); Yi Zhou, Changsha (CN); Wang Liu, Changsha (CN); Jianping Jiang, Changsha (CN)

(73) Assignee: National University of Defense Technology, Changsha (CN)

( * ) Notice: Subject to any disclaimer, the term of this patent is extended or adjusted under 35 U.S.C. 154(b) by 194 days.

(21) Appl. No.: 15/680,974

(22) Filed: Aug. 18, 2017

(65) Prior Publication Data

US 2018/0081146 A1    Mar. 22, 2018

(30) Foreign Application Priority Data

Sep. 18, 2016 (CN) .......................... 2016 1 0830338

(51) Int. Cl.
  *G02B 7/182* (2006.01)
  *G01J 1/42* (2006.01)
  (Continued)

(52) U.S. Cl.
  CPC ............ *G02B 7/182* (2013.01); *G01J 1/4257* (2013.01); *G02B 7/004* (2013.01); *G02B 7/005* (2013.01);
  (Continued)

(58) Field of Classification Search
  CPC ...... G01M 11/04; G01M 11/005; G01M 9/06; G01S 7/497; G02B 7/182; G02B 7/1827;
  (Continued)

(56) References Cited

U.S. PATENT DOCUMENTS

| 3,966,327 A | * | 6/1976 | Hanson | G01B 11/26 356/138 |
| 5,440,146 A | * | 8/1995 | Steffen | G03B 42/02 250/580 |

(Continued)

FOREIGN PATENT DOCUMENTS

| CN | 101699222 A | * | 4/2010 |
| CN | 101699222 A | | 4/2010 |

(Continued)

*Primary Examiner* — Que Tan Le
*Assistant Examiner* — Jennifer D Bennett
(74) *Attorney, Agent, or Firm* — CBM Patent Counsulting, LLC

(57) ABSTRACT

An experimental system for laser beam measurement and steering control, and relates to the technical field of optical, mechanical and electronic integration experimental systems. It includes: a high-precision optical mirror, a piezoelectric micro-actuator, a vibration exciter, a signal collection subsystem, a laser emitter, a beam splitter mirror, a fast steering mirror, a mechanical vibration isolation air bearing table, an optical vibration isolation air bearing table, a data processing and analyzing subsystem, and data transmission lines and power supply lines between subsystems and components. It uses a deflection angle of the laser beam as a control variation, can not only precisely measure the deflection angle of the laser beam, but also inhibit vibration of the high-precision optical mirror by using the piezoelectric micro-actuator and directly adjust the steering of the emitted laser beam by using the fast steering mirror, thereby improving precision of beam steering control.

10 Claims, 7 Drawing Sheets

(51) Int. Cl.
  *G02B 7/00* (2006.01)
  *G02B 7/02* (2006.01)
  *G02B 26/08* (2006.01)
  *G02B 27/14* (2006.01)
(52) U.S. Cl.
  CPC ............. *G02B 7/02* (2013.01); *G02B 7/1821* (2013.01); *G02B 7/1827* (2013.01); *G02B 26/0816* (2013.01); *G02B 26/0875* (2013.01); *G02B 27/14* (2013.01)

(58) Field of Classification Search
  CPC .. G02B 7/1821; G02B 26/0875; G02B 7/004; G02B 7/005; G02B 26/0186; G02B 27/14; G02B 7/02; G01J 1/4257
  See application file for complete search history.

(56) References Cited

U.S. PATENT DOCUMENTS

| | | | |
|---|---|---|---|
| 8,752,969 B1* | 6/2014 | Kane | G02B 7/1821 |
| | | | 356/139.05 |
| 9,115,977 B2* | 8/2015 | Chen | G01M 5/005 |
| 2016/0252603 A1* | 9/2016 | Kelchner | G01M 9/06 |
| | | | 701/14 |

FOREIGN PATENT DOCUMENTS

| | | | |
|---|---|---|---|
| CN | 103234674 A | | 8/2013 |
| CN | 103267493 A | | 8/2013 |
| CN | 203132813 U | | 8/2013 |
| CN | 105700108 A | * | 6/2016 |
| CN | 105700108 A | | 6/2016 |
| JP | 10213759 A | * | 8/1998 |
| JP | 2001027527 A | | 1/2001 |

* cited by examiner

EXPERIMENTAL SYSTEM FOR LASER BEAM MEASUREMENT AND STEERING CONTROL

TECHNICAL FIELD

The present invention relates to laser beam steering control technologies, and in particular, to a laser beam measurement and steering control system.

BACKGROUND ART

With application of high-precision optical systems such as laser communication and laser processing, optical systems have increasingly higher requirements for beam steering precision, and effects of various dynamic interference of environments on optical systems cannot be neglected. Mechanical vibration caused by environment temperature change, atmospheric turbulence, dust and smoke, and various reasons may affect performance of the optical systems in different degrees, even causes that the systems cannot normally work, severely hampering a practical process of the high-precision optical system. Therefore, real-time precision measurement needs to be performed on deviation of a laser beam and high-precision control needs to be performed on a steering of the laser beam.

The optical, mechanical and electronic integration technology refers to a group technology that integrate new technologies such as optics, mechanics, electronics, information processing and control, and proprietary software, that is, a mechanical and electronic integration technology using a beam (a steering, wavefront, and intensity of the beam) in an optical system as a control object. Currently, the optical, mechanical and electronic integration technology applied to the optical system mainly includes a composite axis control technology, a beam stabilization control technology and so on. The composite axis control system is mainly composed of a coarse aiming mechanism, a precision aiming mechanism, and a sensor, and is used for a large range and high precision of photoelectric tracking for a dynamic or static target, but the aiming mechanisms mostly have large sizes and complex structures. The beam stabilization control system mainly includes a sensor, a fast steering mirror, and a voice coil actuator, and is used to decrease an effect of environmental vibration on the beam quality and beam steering stability. The system directly controls an emitted laser beam, but cannot implement suppression or control of vibration on an optical platform. However, currently, there is no optical, mechanical and electronic integration optical system that can directly control the emitted laser beam and can inhibit or control vibration of the optical platform, thereby achieving high-precision control of the laser beam steering. Meanwhile, the system structure is simple, and the actuator has a small volume and a light mass.

SUMMARY OF THE INVENTION

To overcome the technical defect that there is high requirements for precision of laser beam steering control, and the optical, mechanical and electronic integration control system is complex, the present invention provides an experimental system for laser beam measurement and steering control, which can precisely measure a deflection angle of the laser beam, and can inhibit vibration of the high-precision optical mirror and directly adjust the steering of the emitted laser beam, thereby improving beam steering control precision and achieving functions such as real-time measurement of a beam deflection angle, precise measurement of tiny vibration, simulation of multiple working conditions, and combination and comparison of different control methods; and the use method is relatively convenient.

The technical solutions of the present invention are as follows:

An experimental system for laser beam measurement and steering control includes: a high-precision optical mirror 1, a piezoelectric ceramic micro-actuator 2, a vibration exciter 3, a signal collection subsystem 4, a laser emitter 5, a beam splitter mirror 6, a fast steering mirror 7, a mechanical vibration isolation air bearing table 8, an optical vibration isolation air bearing table 9, a data processing and analyzing subsystem 10, and data transmission lines and power supply lines between subsystems and components. the experimental system for laser beam measurement and steering control can simulate different working environments of the high-precision optical mirror, precisely measure a laser beam deviation angle, and control a laser beam steering;

the high-precision optical mirror is composed of an optical reflector 1-1 and a reflector holder platform 1-2; the reflector holder platform 1-2 is composed of a reflector holder plate 1-201, a reflector holder 1-202, a reflector holder monoblock casting 1-203, and a pair of passive screw thread pairs, which are all made of stainless steel; the optical reflector 1-1 is installed on the reflector holder plate 1-201, the reflector holder plate 1-201 is embedded in the reflector holder 1-202, and the reflector holder 1-202 is connected to the reflector holder monoblock casting 1-203 by means of the passive screw thread pairs;

the piezoelectric ceramic micro-actuator 2 is connected to the reflector holder 1-202 and the reflector holder monoblock casting 1-203, stretches and retracts under drive of a piezoelectric ceramic micro-actuator control signal, changes a posture of the reflector holder 1-202, and further controls a space posture of the optical reflector 1-1 and changes a steering of a laser beam reflected via the optical reflector 1-1;

the signal collection subsystem 4 is composed of an acceleration sensor 4-101, an acceleration sensor 4-102, an acceleration sensor 4-103, an angle measurement photosensitive sensor 4-201, an angle measurement photosensitive sensor 4-202, and a target photosensitive sensor 4-203;

the beam splitter mirror 6 is composed of a beam splitter mirror 6-1 and a beam splitter mirror 6-2;

the fast steering mirror 7 is composed of a structural frame 7-1, an optical reflector 7-2, and four voice coil actuators 7-3 to 7-6; the four voice coil actuators 7-3 to 7-6 are symmetrically distributed on four corners of the rear part of the optical reflector 7-2 and are fixed on a structural frame 7-1, stretch and retract forward and backward under a fast steering mirror control signal, drive the optical reflector 7-2 to incline in horizontal and vertical directions, control an inclined posture angle of the optical reflector 7-2, and change a steering of a laser beam reflected via the fast steering mirror 7;

the mechanical vibration isolation air bearing table 8 is installed on a laboratory foundation, thereby not only isolating vibration transferred by the foundation and providing stable installation platforms for the high-precision optical mirror 1, the vibration exciter 3, the acceleration sensor 4-101, the acceleration sensor 4-102, and the acceleration sensor 4-103, but also vibrating under excitation of the vibration exciter 3 and simulating a working environment of the high-precision optical mirror 1;

the optical vibration isolation air bearing table 9 is installed on the laboratory foundation, thereby isolating vibration transferred by the foundation and providing stable installation environments for the laser emitter 5, the beam splitter mirror 6-1, the beam splitter mirror 6-2, the angle measurement photosensitive sensor 4-201, the angle measurement photosensitive sensor 4-202, the target photosensitive sensor 4-203, and the fast steering mirror 7; and the data processing and analyzing subsystem 10 is composed of a dSPACE 10-1, a PC machine 10-2, and experimental system control software.

Further, the mechanical vibration isolation air bearing table 8 and the optical vibration isolation air bearing table 9 are installed on the laboratory foundation, have good vibration isolation performance, can isolate broadband vibration interference transferred from the foundation, and improve precision of laser beam measurement and steering control experiments.

Further, the vibration exciter 3 is installed on the mechanical vibration isolation air bearing table 8, simulates, according to a working condition of the experimental system control software, an instruction signal to excite the mechanical vibration isolation air bearing table 8 to vibrate, and simulates a working environment of the high-precision optical mirror 1.

Further, the laser emitter 5 is installed on the optical vibration isolation air bearing table 9.

Further, the high-precision optical mirror 1 is installed on the mechanical vibration isolation air bearing table 8 and reflects a laser emitted by the laser emitter 5.

Further, the beam splitter mirror 6-1 and the beam splitter mirror 6-2 are installed on the optical vibration isolation air bearing table 9 in parallel. The beam splitter mirror 6-1 performs beam splitting on a laser emitted by high-precision optical mirror 1; one beam is incident on the angle measurement photosensitive sensor 4-201 after being reflected, and the other beam continues being incident on the beam splitter mirror 6-2 along an original optical path propagation direction; the beam splitter mirror 6-2 performs beam splitting on a laser transmitted via the beam splitter mirror 6-1, one beam is incident on the angle measurement photosensitive sensor 4-202 after being reflected, and the other beam continues being incident on the fast steering mirror 7 along an original optical path propagation direction.

Further, the fast steering mirror 7 is installed on the optical vibration isolation air bearing table 9; the voice coil actuators 7-3 to 7-6 are driven by the fast steering mirror control signal sent by the experimental system control software, changes an inclined posture angle of the fast steering mirror optical reflector 7-2, and the laser beam is finally projected on the target photosensitive sensor 4-203 via reflection of the fast steering mirror 7, thereby achieving direct control of the steering of the laser beam.

Further, the angle measurement photosensitive sensor 4-201 and the angle measurement photosensitive sensor 4-202 of the signal collection subsystem 4 are installed on the optical vibration isolation air bearing table 9, respectively connect coordinate information of light spots of laser beams on which beam splitting and reflection are performed via the beam splitter mirror 6-1 and the beam splitter mirror 6-2 on the angle measurement photosensitive sensor 4-201 and the angle measurement photosensitive sensor 4-202 in horizontal and vertical directions, and input the information into the data processing and analyzing subsystem 10. The target photosensitive sensor 4-203 of the signal collection subsystem 4 is installed on the optical vibration isolation air bearing table 9, collects coordination information of light spots of finally emitted laser beams on the target photosensitive sensor 4-203 in horizontal and vertical directions, and inputs the information into a data processing and analyzing subsystem 10. The acceleration sensor 4-101 and the acceleration sensor 4-102 of the signal collection subsystem 4 are installed on the mechanical vibration isolation air bearing table 8, and the acceleration sensor 4-103 is installed on the vibration exciter 3, and respectively collect vibration acceleration information of them, and input the information into the data processing and analyzing subsystem 10.

Further, the dSPACE 10-1 of the data processing and analyzing subsystem 10 preprocesses signals collected by the acceleration sensor 4-101, the acceleration sensor 4-102, the acceleration sensor 4-103, the angle measurement photosensitive sensor 4-201, the angle measurement photosensitive sensor 4-202, and the target photosensitive sensor 4-203 of the signal collection subsystem 4, then inputs the signals into the PC machine 10-2, and after calculation of the experimental system control software installed on the PC machine 10-2, a deflection angle of the laser beam, a piezoelectric ceramic micro-actuator control signal, and a fast steering mirror control signal are obtained; the piezoelectric ceramic micro-actuator control signal and the fast steering mirror control signal are respectively output to the piezoelectric ceramic micro-actuator 2 and the fast steering mirror 7 via the dSPACE 10-1; the steering of the laser beam is controlled, and meanwhile, by means of different working condition parameter settings of the experimental system control software, the data processing and analyzing subsystem 10 provides a vibration excitation instruction signal corresponding to the vibration exciter 3, to simulate different working environments of the high-precision optical mirror 1.

Further, coordinates of the light spots in horizontal and vertical directions measured by the angle measurement photosensitive sensor 4-201 and the angle measurement photosensitive sensor 4-202 are respectively $x_1,y_1$ and $x_2,y_2$, and a calculation formula of the deflection angle of the laser beam is as follows:

$$\tan\theta = \frac{\sqrt{(\Delta x)^2 + (\Delta y)^2}}{h_2 - h_1 + L}$$

in the formula, $\Delta x = x_2 - x_1$, $\Delta y = y_2 - y_1$, $h_1, h_2$ are distances of an intersection point between an unbiased beam and the beam splitter mirror 6-1 and the beam splitter mirror 6-2 respectively distant from the angle measurement photosensitive sensor 4-201 and the angle measurement photosensitive sensor 4-202, are a distance between the beam splitter mirror 6-1 an the beam splitter mirror 6-2.

Further, steering control of the finally emitted laser beam is mainly achieved by using the following two methods: by means of different settings of the experimental system control software, the two methods can be used in parallel, or can be used independently: one is inhibiting vibration of the high-precision optical mirror 1 by using the piezoelectric ceramic micro-actuator 2, reducing an effect of environment vibration on the steering of the laser beam reflected by the high-precision optical mirror 1, and improving stability and precision of the steering of the laser beam; and the second one is: before the laser beam is projected on the target photosensitive sensor 4-203, directly adjusting the steering of the laser beam by using the fast steering mirror 7, and improving precision of the emitted laser beam.

As compared with the existing technology, beneficial effects of the present invention are as follows:
by means of the foregoing designs, establishing an experimental system for laser beam measurement and steering control. As compared with the existing technology, the present invention has advantages, for example, the system has a simple structure, operation are simple and convenient, and the actuator mechanism has a small volume and a light mass, and meanwhile, the present invention can be used for high-precision measurement of tiny vibration.

DETAILED DESCRIPTION OF THE INVENTION

An experimental system for laser beam measurement and steering control is described in detail with reference to the drawings in the follow.

Figure 1:
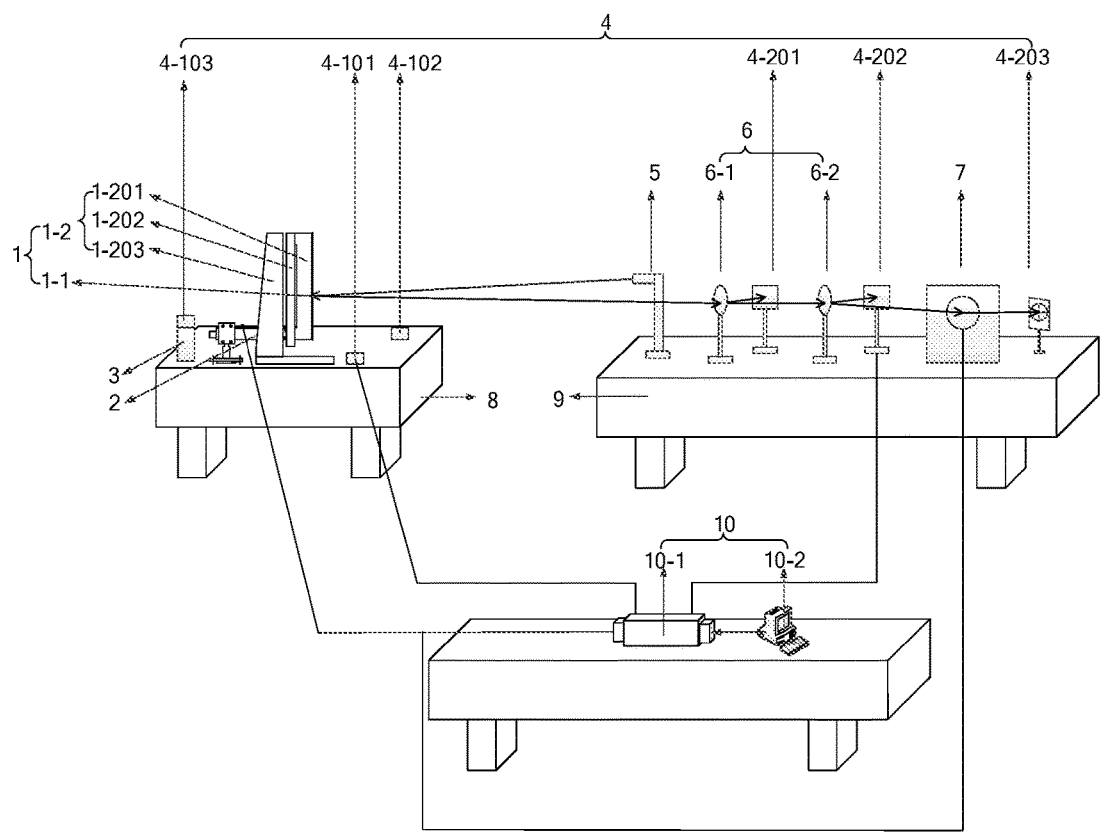
FIG. 1 is a schematic diagram of an experimental system.
Figure 2:
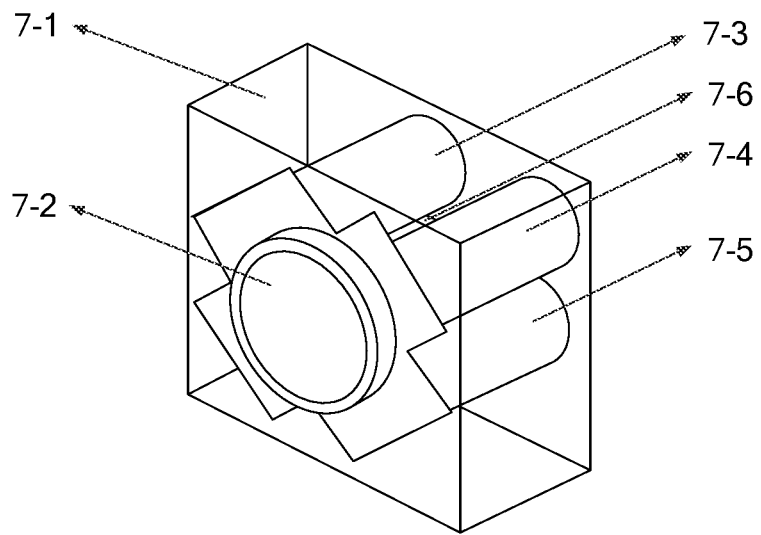
FIG. 2 is a schematic structural diagram of a fast steering mirror 7.
Figure 3:
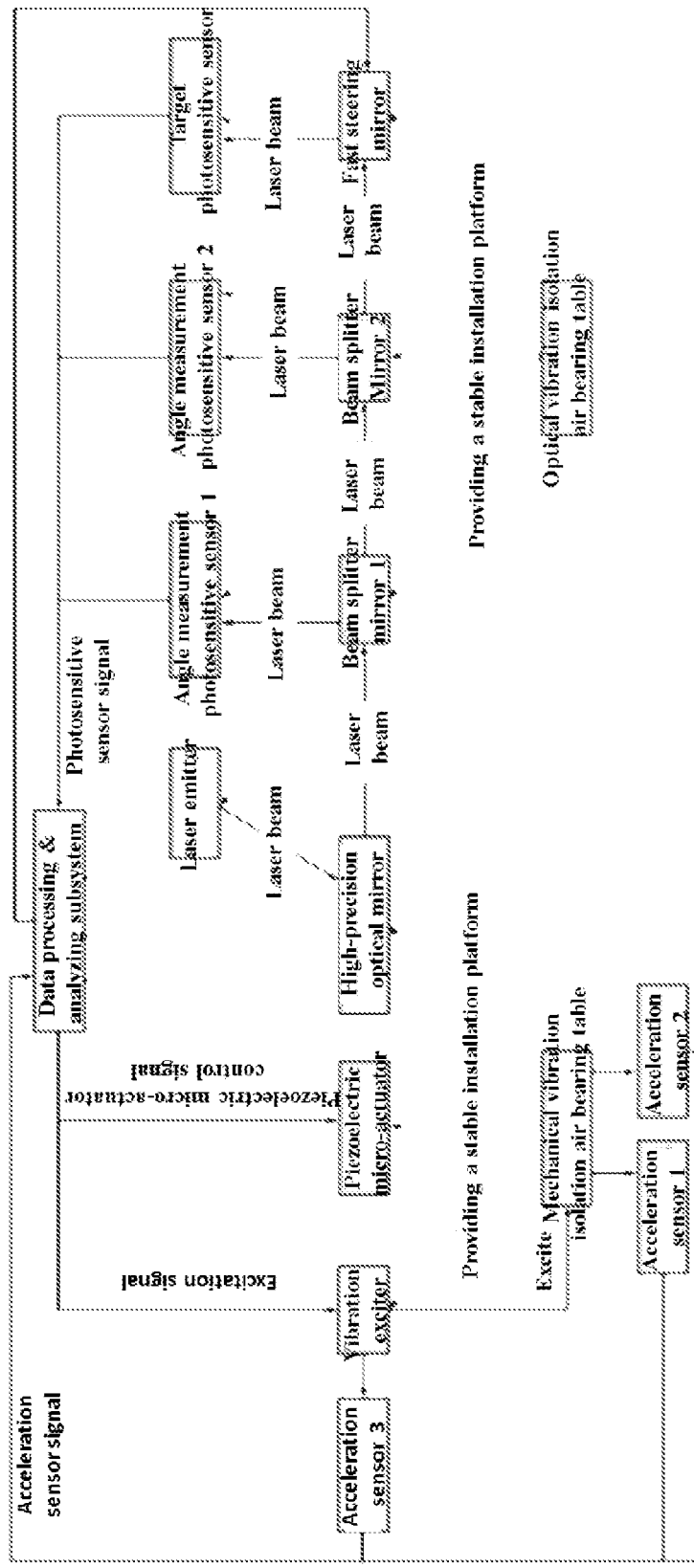
FIG. 3 is a working principle diagram of an experimental system.
Figure 4:
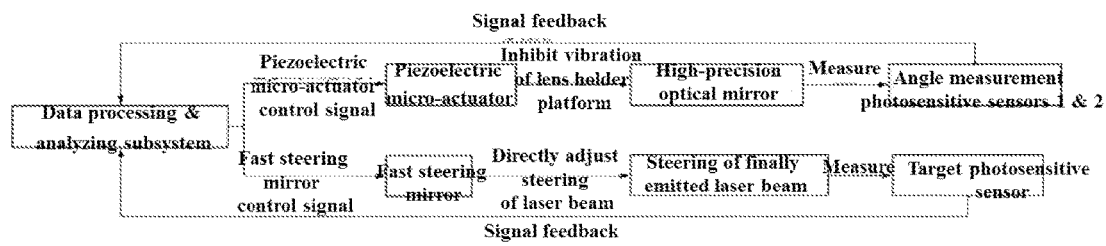
FIG. 4 is a loop diagram of an experimental system.
Figure 5:
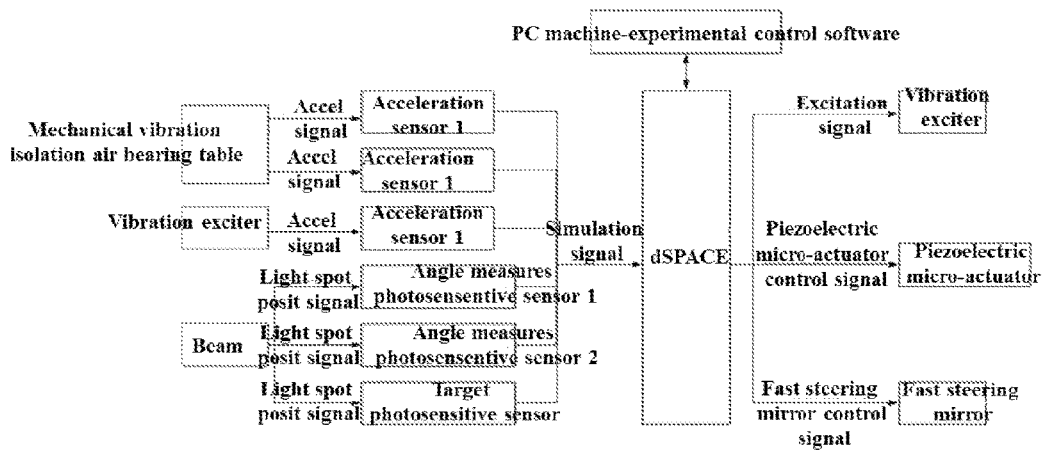
FIG. 5 is a data flowchart of an experimental system.
Figure 6:
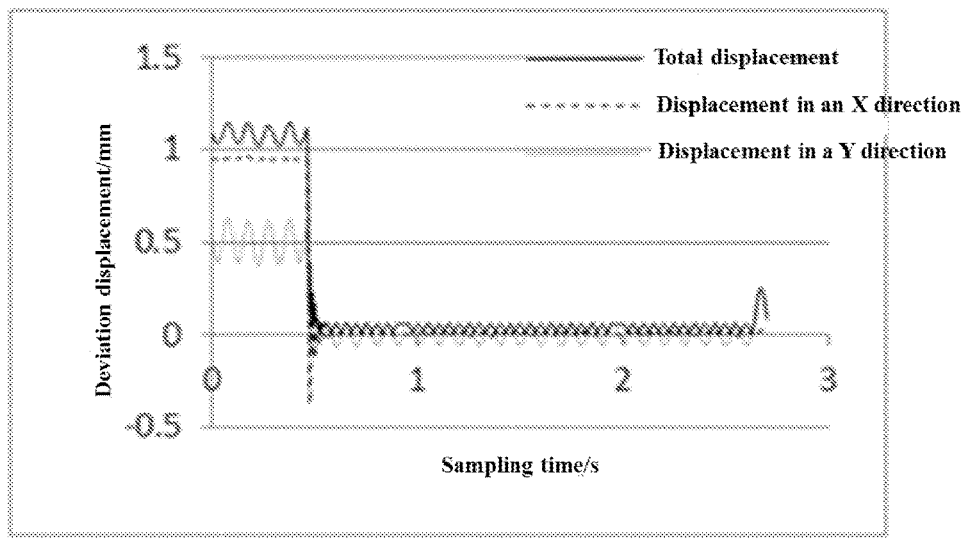
FIG. 6 is a curve diagram of a control effect under a 10 Hz excitation condition.
Figure 7:
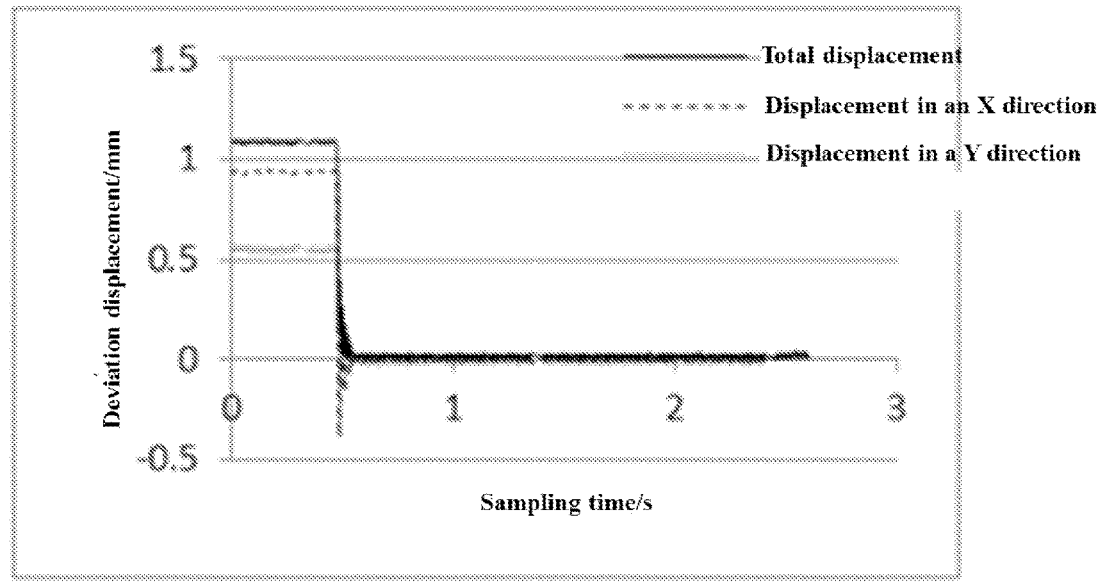
FIG. 7 is a curve diagram of a control effect under a 50 Hz excitation condition.
Figure 8:
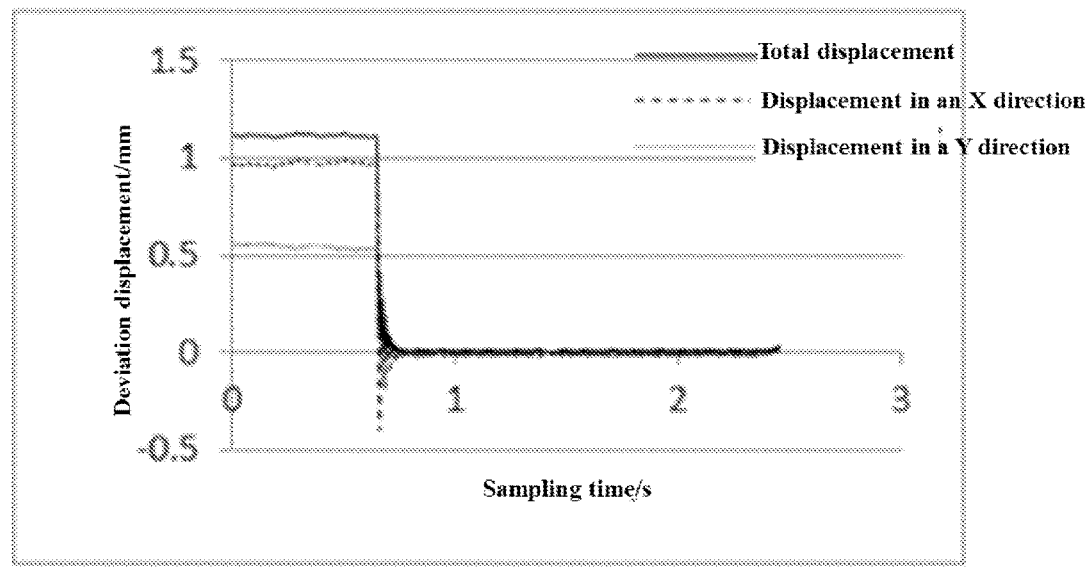
FIG. 8 is a curve diagram of a control effect under a 150 Hz excitation condition.

FIG. 1 is a specific embodiment of the present invention, and the present invention is not limited to the embodiment. FIG. 1 shows a schematic diagram of an experimental system for laser beam measurement and steering control, FIG. 2 shows a schematic structural diagram of a fast steering mirror 7, FIG. 3 shows a working principle diagram of the experimental system, FIG. 4 shows a loop diagram of the experimental system, and FIG. 5 shows a data flowchart of the experimental system. The experimental system for laser beam measurement and steering control includes: a high-precision optical mirror 1, a piezoelectric ceramic micro-actuator 2, a vibration exciter 3, a signal collection subsystem 4, a laser emitter 5, a beam splitter mirror 6, a fast steering mirror 7, a mechanical vibration isolation air bearing table 8, an optical vibration isolation air bearing table 9, a data processing and analyzing subsystem 10, and data transmission lines and power supply lines between subsystems and components.

The mechanical vibration isolation air bearing table 8 and the optical vibration isolation air bearing table 9 use SQT1015 (a precise optical platform) of HuaWeiHaoRun, the size of SQT1015 is 1000 mmΔ1500 mm×800 mm and is installed on the laboratory foundation, has a good vibration isolation performance, and can isolate broadband vibration interference transferred from the foundation.

The laser emitter 5 is installed on the optical vibration isolation air bearing table 9, and uses an HNL050L-EC He-Ne laser of THORLABS. The laser has a wavelength of 632.8 nm, a light spot diameter of 1 mm, and a divergence of 1 mrad.

The high-precision optical mirror 1 is installed on the mechanical vibration isolation air bearing table 8, and is composed of an optical reflector 1-1 and a reflector holder platform 1-2; the reflector holder platform 1-2 is composed of a reflector holder plate 1-201, a reflector holder 1-202, a reflector holder monoblock casting 1-203, and a pair of passive screw thread pairs, which are all made of stainless steel; the reflector holder plate 1-201 is embedded in the reflector holder 1-202, and the reflector holder 1-202 is connected to the reflector holder monoblock casting 1-203 by means of the passive screw thread pairs; the optical reflector 1-1 are installed on the reflector holder plate 1-201 and reflect laser emitted by the laser emitter 5.

The piezoelectric ceramic micro-actuator 2 is connected to the reflector holder 1-202 and the reflector holder monoblock casting 1-203, stretches and retracts under drive of a piezoelectric ceramic micro-actuator control signal, changes a posture of the reflector holder 1-202, and further controls a space posture of the optical reflector 1-1 and changes a steering of a laser beam reflected via the optical reflector 1-1.

For the specific structure of the piezoelectric ceramic micro-actuator 2, refer to a patent application document with a patent application number 201610227613.8, entitled "piezoelectric ceramic micro-actuator for optical mirror vibration control", and filed on Apr. 13, 2016.

The beam splitter mirror 6-1 and the beam splitter mirror 6-2 of the beam splitter mirror 6 are installed on the optical vibration isolation air bearing table 9 in parallel, use OMC 30-82 of Zolix, have diameters of 12.1 mm, have a beam splitting proportion of 3:1, and the applicable wavelength is 200 nm to 900 nm. The beam splitter mirrors are used to perform beam splitting on the laser beam. The beam splitter mirror 6-1 performs beam splitting on a laser emitted by high-precision optical mirror 1; one beam is incident on the angle measurement photosensitive sensor 4-201 after being reflected, and the other beam continues being incident on the beam splitter mirror 6-2 along an original optical path propagation direction; the beam splitter mirror 6-2 performs beam splitting on a laser transmitted via the beam splitter mirror 6-1, one beam is incident on the angle measurement photosensitive sensor 4-202 after being reflected, and the other beam continues being incident on the fast steering mirror 7 along an original optical path propagation direction.

The fast steering mirror 7 is installed on the optical vibration isolation air bearing table 9, by means of FSM-300-02 of the NEWPORT, X, Y two-dimensional control, a mirror diameter, the mirror thickness, a maximum deflection angle, control precision, resolution, and a control bandwidth. The fast steering mirror 7 is composed of a structural frame 7-1, an optical reflector 7-2, and four voice coil actuators 7-3 to 7-6. The four voice coil actuators 7-3 to, 7-6 are symmetrically distributed on four corners of the rear part of the optical reflector 7-2 and are fixed on a structural frame 7-1, stretch and retract forward and backward under a fast steering mirror control signal, drive the optical reflector 7-2 to incline in horizontal and vertical directions, control an inclined posture angle of the optical reflector 7-2, and change a steering of a laser beam reflected via the fast steering mirror 7.

The angle measurement photosensitive sensor 4-201, the angle measurement photosensitive sensor 4-202, and the target photosensitive sensor 4-203 of the signal collection subsystem are installed on the optical vibration isolation air bearing table 9, use PDP90A of THORLABS, which is a 2D horizontal effect position sensor, has a size of 9 mm×9 mm, a sensitive wavelength range of 320 nm to 1100 nm, and a position resolution of 0.675 μm. The angle measurement photosensitive sensor 4-201 and the angle measurement photosensitive sensor 4-202 respectively connect coordinate information of light spots of laser beams on which beam splitting and reflection are performed via the beam splitter mirror 6-1 and the beam splitter mirror 6-2 on the angle measurement photosensitive sensor 4-201 and the angle measurement photosensitive sensor 4-202 in horizontal and vertical directions, and input the information into the data processing and analyzing subsystem 10. The target photosensitive sensor 4-203 is installed on the optical vibration isolation air bearing table 9, collect coordinate information of light spots of finally emitted laser beams on the target photosensitive sensor 4-203 in horizontal and vertical directions, and input the information into the data processing and analyzing subsystem 10.

The vibration exciter 3 uses 2025E of Modelshop, is installed on the mechanical vibration isolation air bearing table 8, simulates, according to a working condition of the experimental system control software, an instruction signal to excite the mechanical vibration isolation air bearing table 8 to vibrate, and simulates a working environment of the high-precision optical mirror 1.

The acceleration sensor 4-101 and the acceleration sensor 4-102 of the signal collection subsystem 4 are installed on the mechanical vibration isolation air bearing table 8. The acceleration sensor 4-103 is installed on the vibration exciter 3. The acceleration sensor 4-101 and the acceleration sensor 4-102 both use a three-axis acceleration sensor, and the acceleration sensor 4-103 uses a single-axis acceleration sensor, respectively collect vibration acceleration information of the mechanical vibration isolation air bearing table 8 and the vibration exciter 3, and input the information into the data processing and analyzing subsystem 10. However, the information is not introduced into a control algorithm, and is only used as reference data.

The dSPACE 10-1 of the data processing and analyzing subsystem 10 uses a DS1005 type measure and control simulation system of dSPACE, preprocesses signals collected by the acceleration sensor 4-101, the acceleration sensor 4-102, the acceleration sensor 4-103, the angle measurement photosensitive sensor 4-201, the angle measurement photosensitive sensor 4-202, and the target photosensitive sensor 4-203 of the signal collection subsystem 4, and inputs the signals into the PC machine 10-2.

The PC machine 10-2 of the data processing and analyzing subsystem 10 uses Compaq 8300 of HP, an operation system of Windows 7, and is installed with experimental system control software.

The experimental system control software of the data processing and analyzing subsystem 10 is installed on the PC machine 10-2, and is obtained by voluntary developing based on the Simulink nodule of MATLAB, and the software calculation uses a common control algorithm, such as PID control or fuzzy control. After calculation of the experimental system control software, a deflection angle of the laser beam, a piezoelectric ceramic micro-actuator control signal, and a fast steering mirror control signal are obtained. The piezoelectric ceramic micro-actuator control signal and the fast steering mirror control signal are respectively output to the piezoelectric ceramic micro-actuator 2 and the fast steering mirror 7 via the dSPACE 10-1; the steering of the laser beam is controlled, and meanwhile, by means of different working condition parameter settings of the experimental system control software, the data processing and analyzing subsystem 10 provides a vibration excitation instruction signal corresponding to the vibration exciter 3, to simulate different working environments of the high-precision optical mirror 1.

Figure 9:
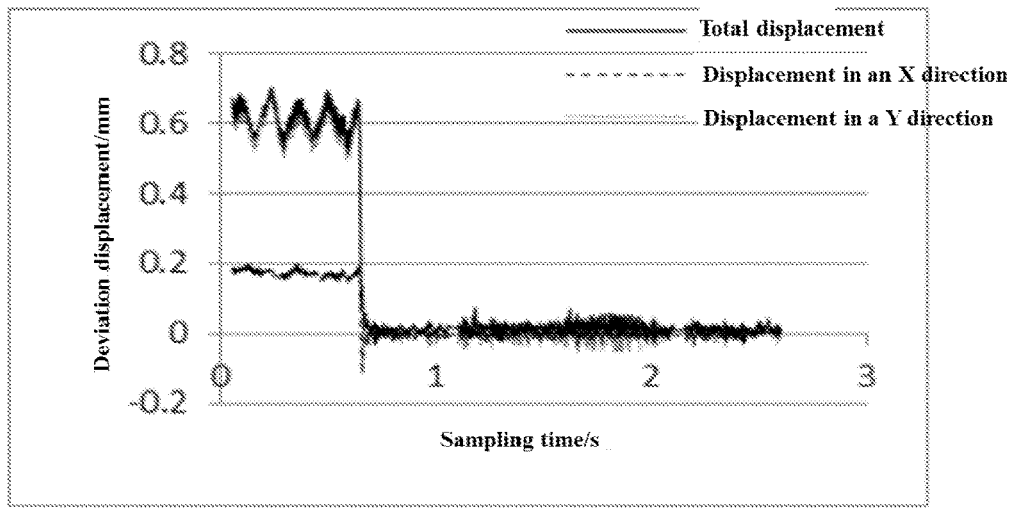
FIG. 9 is a curve diagram of a control effect under a random excitation condition.
Figure 10:
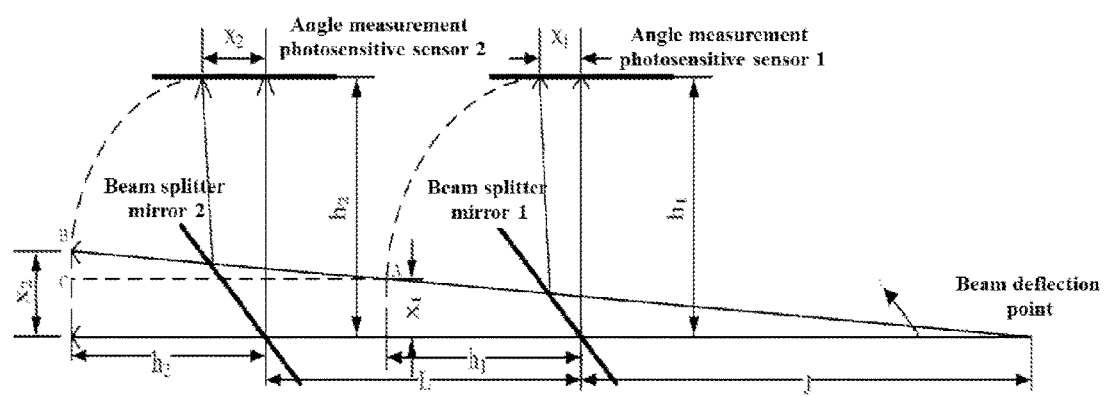
FIG. 10 is a schematic diagram of an optical path of a beam deflection angle calculation method.

Beam steering control experiments of the high-precision optical mirror 1 are used to illustrate the control effect. According to settings of the simulation working conditions of the experimental system control software, harmonic excitation with a same amplitude is applied to three frequency points of 10 Hz, 50 Hz, and 150 Hz to perform vibration excitation on the mechanical vibration isolation air bearing table 8. Vibration is delivered to the high-precision optical mirror 1 installed on the mechanical vibration isolation air bearing table 8 via the mechanical vibration isolation air bearing table 8, causing vibration of the optical reflector 1-1 of the high-precision optical mirror 1. After the laser beam emitted by the laser emitter 5 is reflected by the vibrated and excited optical reflector 1-1, the laser beam sequentially passes through the beam splitter mirror 6-1 and the beam splitter mirror 6-2, and the reflected split beam light respectively forms light spots on the angle measurement photosensitive sensor 4-201 and the angle measurement photosensitive sensor 4-202. Meanwhile, the other transmissive split beam sequentially passes through the beam splitter mirror 6-1 and the beam splitter mirror 6-2 forms light spots on the target photosensitive sensor 4-203 along an original optical path steering. Coordinates of the light spots of the angle measurement photosensitive sensor 4-201, the angle measurement photosensitive sensor 4-202, and the target photosensitive sensor 4-203 in horizontal and vertical directions are respectively delivered to the PC machine 10-2 via the dSPACE 10-1. After calculation of the experimental system control software of the PC machine 10-2, a deflection angle of the laser beam, a piezoelectric ceramic micro-actuator control signal, and a fast steering mirror control signal are obtained. The piezoelectric ceramic micro-actuator control signal is delivered to the piezoelectric ceramic micro-actuator 2 via the dSPACE 10-1, drives it to stretch and retract and control the pitch yaw attitude of the reflector holder plate 1-201, and further control space posture stability of the optical reflector 1-1 in the high-precision optical mirror 1, and improve stability and precision of the steering of the laser beam reflected via the optical reflector 1-1 of the high-precision optical mirror 1. The fast steering mirror control signal is delivered to the voice coil actuators 7-3 to 7-6 of the fast steering mirror via the dSPACE 10-1. The combination of the four drive voice coil actuators stretches and retracts forward and backward, changes a space posture of the optical reflector 7-2 of the fast steering mirror, and directly adjusts the steering of the laser beam, and improves precision of the steering of the laser beam finally projected to the target photosensitive sensor 4-203. It can be obtained from experiments that the curve of a control effect of the laser beam steering under simple harmonic excitation of three frequency points are respectively shown in FIG. 6 to FIG. 8; a control effect curve under random excitation is shown in FIG. 9; longitudinal coordinates of FIG. 6 to FIG. 9 are laser spot offsets with a unit of nm. The optical path diagram of the experimental system is shown in FIG. 10. It can be obtained that the calculation formula of the beam deflection angle is as follows:

$$\tan\theta = \frac{\sqrt{(\Delta x)^2 + (\Delta y)^2}}{h_2 - h_1 + L}$$

In the formula, $x_1, y_1$ and $x_2, y_2$ are respectively coordinates of the light spot measured by the angle measurement photosensitive sensor 4-201 and the angle measurement photosensitive sensor 4-202 in horizontal and vertical directions, and $\Delta x = x_2 - x_1$, $\Delta y = y_2 - y_1$ and $h_1 = 0.7$ m, $h_2 = 0.7$ m are respectively distances of an intersection point between an unbiased beam and the beam splitter mirror 6-1 and the beam splitter mirror 6-2 respectively distant from the angle measurement photosensitive sensor 4-201 and the angle measurement photosensitive sensor 4-202, L=0.7 m is a distance between the beam splitter mirror 6-1 an the beam splitter mirror 6-2, and J=10 m is a distance between the beam deflection point and the beam splitter mirror 6-1. The beam deflection point is a laser reflection point of the optical reflector 1-1 on the high-precision optical mirror 1.

FIG. 6 to FIG. 9 are comparison diagrams of control effects under different excitation conditions. The interval of 0-0.05 s in each diagram is a light spot deviation offset, and the intervals after 0.5 s are light spot deviation offsets after controlling. The results before controlling and after controlling in the diagrams are compared. It can be obtained by calculation from the formula that the precision of laser beam steering control of the high-precision optical mirror 1 reaches a microradian level, verifying validity of the experimental system for laser beam measurement and steering control. The system of the present invention has a simple structure, simple and convenient operation, and the actuator mechanism has a small volume and a light mass, and can be used for high-precision measurement of tiny vibration.

What is claimed is:

1. An experimental system for laser beam measurement and steering control, characterized by comprising a high-precision optical mirror (1), a piezoelectric ceramic micro-actuator (2), a vibration exciter (3), a signal collection subsystem (4), a laser emitter (5), a beam splitter mirror (6), a fast steering mirror (7), a mechanical vibration isolation air bearing table (8), an optical vibration isolation air bearing table (9), a data processing and analyzing subsystem (10), and data transmission lines and power supply lines between subsystems and components, wherein the experimental system for laser beam measurement and steering control simulates different working environments of the high-precision optical mirror (1), precisely measure a laser beam deviation angle, and control a laser beam steering;

the high-precision optical mirror (1) is composed of a first optical reflector (1-1) and a reflector holder platform (1-2); the reflector holder platform (1-2) is composed of a reflector holder plate (1-201), a reflector holder (1-202), a reflector holder monoblock casting (1-203), and a pair of passive screw thread pairs, which are all made of stainless steel; the first optical reflector (1-1) is installed on the reflector holder plate (1-201), the reflector holder plate (1-201) is embedded in the reflector holder (1-202), and the reflector holder (1-202) is connected to the reflector holder monoblock casting (1-203) via the passive screw thread pairs;

the piezoelectric ceramic micro-actuator (2) is connected to the reflector holder (1-202) and the reflector holder monoblock casting (1-203), stretches and retracts under drive of a piezoelectric ceramic micro-actuator control signal, changes a posture of the reflector holder (1-202), and further controls a space posture of the first optical reflector (1-1) and changes a steering of a laser beam reflected via the first optical reflector (1-1);

the signal collection subsystem (4) is composed of a first acceleration sensor (4-101), a second acceleration sensor (4-102), a third acceleration sensor (4-103), a first angle measurement photosensitive sensor (4-201), a second angle measurement photosensitive sensor (4-202), and a target photosensitive sensor (4-203);

the beam splitter mirror (6) is composed of a first beam splitter mirror (6-1) and a second beam splitter mirror (6-2);

the fast steering mirror (7) is composed of a structural frame (7-1), a second optical reflector (7-2), and four voice coil actuators (7-3, 7-4, 7-5, 7-6); the four voice coil actuators (7-3, 7-4, 7-5, 7-6) are symmetrically distributed on four corners of the rear part of the second optical reflector (7-2) and are fixed on the structural frame (7-1), stretch and retract forward and backward under drive of a fast steering mirror control signal, drive the second optical reflector (7-2) to incline in horizontal and vertical directions, control an inclined posture angle of the second optical reflector (7-2), and change a steering of a laser beam reflected via the fast steering mirror (7);

the mechanical vibration isolation air bearing table (8) is installed on a laboratory foundation and isolates vibration transferred by the foundation and provides stable installation platforms for the high-precision optical mirror (1), the first acceleration sensor (4-101), the second acceleration sensor (4-102), the third acceleration sensor (4-103), and the vibration exciter (3), and the mechanical vibration isolation air bearing table vibrates under an excitation of the vibration exciter (3) simulating a working environment of the high-precision optical mirror (1);

the optical vibration isolation air bearing table (9) is installed on the laboratory foundation, thereby isolating vibration transferred by the foundation and providing stable installation environments for the laser emitter (5), the first beam splitter mirror (6-1), the second beam splitter mirror (6-2), the first angle measurement photosensitive sensor (4-201), the second angle measurement photosensitive sensor (4-202), the target photosensitive sensor (4-203), and the fast steering mirror (7); and the data processing and analyzing subsystem (10) is composed of a dSPACE (10-1), a PC machine (10-2), and experimental system control software.

2. The experimental system for laser beam measurement and steering control according to claim 1, characterized in that the high-precision optical mirror (1) is installed on the mechanical vibration isolation air bearing table (8) and reflects a laser emitted by the laser emitter (5); the vibration exciter (3) is installed on the mechanical vibration isolation air bearing table (8), simulates, according to a working condition of the experimental system control software, an instruction signal to excite the mechanical vibration isolation air bearing table (8) to vibrate, and simulates a working environment of the high-precision optical mirror (1).

3. The experimental system for laser beam measurement and steering control according to claim 1, characterized in that the first beam splitter mirror (6-1) and the second beam splitter mirror (6-2) are installed on the optical vibration isolation air bearing table (9) in parallel, wherein the first beam splitter mirror (6-1) performs beam splitting on a laser emitted by high-precision optical mirror (1); one beam is incident on the first angle measurement photosensitive sensor (4-201) after being reflected, and the other beam continues being incident on the second beam splitter mirror (6-2) along an original optical path propagation direction; the second beam splitter mirror (6-2) performs beam splitting on a laser transmitted via the first beam splitter mirror (6-1), one beam is incident on the second angle measurement photosensitive sensor (4-202) after being reflected, and the other beam continues being incident on the fast steering mirror (7) along an original optical path propagation direction.

4. The experimental system for laser beam measurement and steering control according to claim 3, characterized in that the fast steering mirror (7) is installed on the optical vibration isolation air bearing table (9); the voice coil actuators (7-3, 7-4, 7-5, 7-6) are driven by the fast steering mirror control signal sent by the experimental system control software, changes an inclined posture angle of the second optical reflector (7-2), and the laser beam is finally projected on the target photosensitive sensor (4-203) via reflection of the fast steering mirror (7), thereby achieving direct control of the steering of the laser beam.

5. The experimental system for laser beam measurement and steering control according to claim 4, characterized in that the first angle measurement photosensitive sensor (4-201) and the second angle measurement photosensitive sensor (4-202) of the signal collection subsystem (4) are installed on the optical vibration isolation air bearing table (9), respectively collect coordinate information of light spots of laser beams on which beam splitting and reflection are performed via the first beam splitter mirror (6-1) and the second beam splitter mirror (6-2) on the first angle measurement photosensitive sensor (4-201) and the second angle measurement photosensitive sensor (4-202), respectively, in horizontal and vertical directions, and the information is input into the data processing and analyzing subsystem.

6. The experimental system for laser beam measurement and steering control according to claim 5, characterized in that the target photosensitive sensor (4-203) of the signal collection subsystem (4) is installed on the optical vibration isolation air bearing table (9), collects coordination information of light spots of finally emitted laser beams on the target photosensitive sensor (4-203) in horizontal and vertical directions, and the information is input into a data processing and analyzing subsystem (10).

7. The experimental system for laser beam measurement and steering control according to claim 6, characterized in that the first acceleration sensor (4-101) and the second acceleration sensor (4-102) of the signal collection subsystem (4) are installed on the mechanical vibration isolation air bearing table (8), and the third acceleration sensor (4-103) is installed on the vibration exciter (3), and the first acceleration sensor, the second acceleration sensor and the third acceleration sensor collect vibration acceleration information of the mechanical vibration isolation air bearing table (8) and the vibration exciter (3), and the information is input into the data processing and analyzing subsystem (10), respectively.

8. The experimental system for laser beam measurement and steering control according to claim 7, characterized in that the mechanical vibration isolation air bearing table (8) and the optical vibration isolation air bearing table (9) are installed on the laboratory foundation; the dSPACE (10-1) of the data processing and analyzing subsystem (10) preprocesses signals collected by the first acceleration sensor (4-101), the second acceleration sensor (4-102), the third acceleration sensor (4-103), the first angle measurement photosensitive sensor (4-201), the second angle measurement photosensitive sensor (4-202), and the target photosensitive sensor (4-203) of the signal collection subsystem (4), then inputs the signals into the PC machine (10-2) installed with the experimental system control software), a deflection angle of the laser beam, a piezoelectric ceramic micro-actuator control signal, and a fast steering mirror control signal are obtained; the piezoelectric ceramic micro-actuator control signal and the fast steering mirror control signal are respectively output to the piezoelectric ceramic micro-actuator (2) and the fast steering mirror (7) via the dSPACE (10-1); the steering of the laser beam is controlled, and meanwhile, via different working condition parameter settings of the experimental system control software, the data processing and analyzing subsystem (10) provides a vibration excitation instruction signal corresponding to the vibration exciter (3), to simulate different working environments of the high-precision optical mirror (1).

9. The experimental system for laser beam measurement and steering control according to claim 8, characterized in that coordinates of the light spots in horizontal and vertical directions measured by the first angle measurement photosensitive sensor (4-201) and the second angle measurement photosensitive sensor (4-202) are respectively $x_1$, $y_1$ and $x_2$, $y_2$, and a calculation formula of the deflection angle of the laser beam is as follows:

$$\tan\theta = \frac{\sqrt{(\Delta x)^2 + (\Delta y)^2}}{h_2 - h_1 + L}$$

in the formula, $\Delta x = x_2 - x_1$, $\Delta y = y_2 - y_1$, $h_1, h_2$ are distances of intersection points between an unbiased beam and the first beam splitter mirror (6-1) and the second beam splitter mirror (6-2) respectively distant from the first angle measurement photosensitive sensor (4-201) and the second angle measurement photosensitive sensor (4-202), and L is distances between the first beam splitter mirror (6-1) an the second beam splitter mirror (6-2).

10. The experimental system for laser beam measurement and steering control according to claim 9, characterized in that steering control performed by the experimental system for laser beam measurement and steering control on the finally emitted laser beam is achieved by using the following two methods: one is inhibiting vibration of the high-precision optical mirror (1) by using the piezoelectric ceramic micro-actuator (2), reducing an effect of environment vibration on the steering of the laser beam reflected by the high-precision optical mirror (1), and improving steering stability and precision of the laser beam; and the second one is directly adjusting the steering of the laser beam by using the fast steering mirror (7) before the laser beam is projected on the target photosensitive sensor (4-203), and improving precision of the steering of the emitted laser beam.

* * * * *